United States Patent [19]

Oldermann

[11] Patent Number: 5,691,610

[45] Date of Patent: Nov. 25, 1997

[54] PROCESS FOR REDUCING THE FRICTION BETWEEN A ROTATING HEAD DRUM AND RECORDING MEDIUM IN TAPE FORM DURING WINDING OPERATION

[75] Inventor: Klaus Oldermann, Villingen-Schwenningen, Germany

[73] Assignee: Deutsche Thomson-Brandt GmbH, Villingen-Schwenningen, Germany

[21] Appl. No.: 501,122

[22] PCT Filed: Feb. 17, 1994

[86] PCT No.: PCT/EP94/00450

§ 371 Date: Oct. 27, 1995

§ 102(e) Date: Oct. 27, 1995

[87] PCT Pub. No.: WO94/19799

PCT Pub. Date: Sep. 1, 1994

[30] Foreign Application Priority Data

Feb. 26, 1993 [DE] Germany .................. 43 05 927.9

[51] Int. Cl.$^6$ .................. G11B 15/64; G11B 15/18; G11B 15/473

[52] U.S. Cl. .................. 318/6; 318/7; 360/69; 360/70; 360/73.05

[58] Field of Search .................. 318/560–680, 318/3–17, 245–290; 360/72–88, 71, 69, 70; 226/196, 10; 242/76, 157.1, 186, 189, 190

[56] References Cited

U.S. PATENT DOCUMENTS

| | | | |
|---|---|---|---|
| 3,772,469 | 11/1973 | Johnson et al. | 242/206 |
| 3,852,814 | 12/1974 | Johnson et al. | 360/72 |
| 4,160,195 | 7/1979 | Sakamoto | 318/7 |
| 4,309,023 | 1/1982 | Plumettaz et al. | 254/273 |
| 4,426,665 | 1/1984 | Bradford et al. | 360/10.2 |
| 4,513,229 | 4/1985 | Kudelski | 318/7 |
| 4,965,874 | 10/1990 | Yamazaki | 360/70 |
| 5,125,592 | 6/1992 | Sato | 242/189 |
| 5,218,490 | 6/1993 | Sakamoto et al. | 360/71 |
| 5,319,506 | 6/1994 | Kojima et al. | 360/73.05 |
| 5,510,263 | 4/1996 | Sakamoto et al. | 360/69 |

FOREIGN PATENT DOCUMENTS

| | | |
|---|---|---|
| 0222235 | 5/1987 | European Pat. Off. . |
| 0343252 | 11/1989 | European Pat. Off. . |
| 3927705 | 6/1990 | Germany . |
| 9116346 | 8/1992 | Germany . |
| 9116378 | 10/1992 | Germany . |
| 59-092464 | 5/1984 | Japan . |
| 62-014362 | 1/1987 | Japan . |
| 4134661 | 5/1992 | Japan . |

OTHER PUBLICATIONS

Patent Abstracts of Japan, vol. 11, No. 189, 18 Jun. 1987 & Japanese Patent No. 62014362*, Mitsubishi Electric Corp.

Patent Abstracts of Japan, vol. 16, No. 404, 26 Aug. 1992 & Japanese Patent No. 4134661*, Toshiba Corp.

Patent Abstracts of Japan, vol. 8, No. 208, 21 Sep. 1984 & Japanese Patent No. 59092464*, Matsushita Denki Sangyo K.K.

*Primary Examiner*—Paul Ip
*Attorney, Agent, or Firm*—Joseph S. Tripoli; Frederick A. Wein; Francis A. Davenport

[57] ABSTRACT

A process for reducing the friction between a rotating head drum and a tape-shaped recording medium which surrounds the head drum for recording and/or playing back information. In order to shorten access time to information stored on the tape-shaped recording medium, some recorders have the recording medium mounted in a cassette which remains threaded even during rewinding, and surrounds the head drum in the same way as in the play and search modes. Because the tape remains threaded during rewinding, such recorders, also called full-loading recorders, suffer from increased friction between the rotating head drum and the tape moving in the reverse direction. To reduce friction, the speed of rotation of the head drum is increased by a factor, preferably a factor of 2, during rewinding.

2 Claims, 2 Drawing Sheets

PROCESS FOR REDUCING THE FRICTION BETWEEN A ROTATING HEAD DRUM AND RECORDING MEDIUM IN TAPE FORM DURING WINDING OPERATION

BACKGROUND

For shortening the access time of information stored on recording media in tape form, recording and/or playback devices operating by the helical-scan process, such as for example commercially available video recorders, are known, in which the recording medium stored in a cassette on drivable winding elements remains threaded even during winding operation and thereby wraps around the head drum as in the recorder operating modes of "play" and "search". Such recorders are also referred to as full-loading recorders, as distinct from so-called half-loading and non-loading recorders, in which the recording medium is not in engagement with the head drum during winding operation. In the case of a half-loading recorder, the recording medium is partly unthreaded from the cassette and in the case of a non-loading recorder it is drawn fully into the cassette during winding operation. The head drum comprises a stationary lower part, also referred to as the lower head drum, and a rotatable upper part, which is arranged coaxially with respect to the said lower part, has recording and/or playback heads and is also referred to as the upper head drum.

Because the tape remains threaded during winding operation and because of the resulting sliding friction between the recording medium and the head drum, full-loading recorders suffer, however, from a problem of increased wearing of the head drum and the recording medium. The "backward" winding operation, also referred to as rewind, is the critical case here, since the recording medium and the head drum have opposed driving directions, which can result in a disturbance of the air cushion essentially determining the sliding friction between the recording medium and the head drum, and consequently in an increase in the sliding friction, in particular towards the end of the winding time. Particularly susceptible to this are relatively smooth head drum outer surfaces and cassettes with a recording medium of relatively thin material, such as for example a VHS tape cassette of the E 300 type with an average thickness of the recording medium of 12.5 µm.

To prevent the increase in sliding friction, the solutions listed below are known:

a) lower (constant) winding speed in comparison with non-loading and half-loading recorders, b) reducing the winding speed by open-loop or closed-loop control of the driving speed of the recording medium as a function of an increase in current of the head-drum drive motor, c) providing the outer surface of the upper head drum with turned-profile spirals and/or additional grooves and/or a circumferential bevel at the end neighbouring the lower head drum, d) switching off the head-drum drive with idling or driving of the upper head drum by the recording medium.

However, these solutions have the following disadvantages: at lower winding speed according to a), the winding time is greater. The closed-loop control of the winding speed as a function of the head-drum motor current according to b) requires more complex software for the drive mechanism, usually controlled by means of a microprocessor. In a case of machining the head-drum outer surface according to solution c), the production of the head drum becomes more expensive. The idling operation of the head drum according to d) makes it more difficult for the head drum or the head drum drive to run up to speed when switching over, since the upper head drum, because it is turning in the wrong direction of rotation, first has to be stopped and then accelerated to nominal speed against the recording medium held taut by the unwinding hub.

In order not to increase the wearing of the recording medium and the head drum in comparison with non-loading and half-loading recorders, but on the other hand to cater for the requirement for relatively short winding times, present-day full-loading recorders preferably have a specific machining profile of the upper head drum and a powerful head-drum drive and a powerful hub drive. In addition, closed-loop control of the rewinding speed of the recording carrier as a function of the head-drum motor current is provided.

SUMMARY OF THE INVENTION

It is the object of the invention to reduce the complexity caused by the winding operation in a full-loading recorder.

The invention is based on the idea of increasing the speed of rotation of the head drum to produce a stable air cushion in the region of wrap, in order in this way to achieve a constant sliding friction between the recording medium and the head drum during the entire winding time. This makes use of the following realizations: the increase in the sliding friction is dependent both essentially on the thickness of the recording medium and the condition of the outer surface of the head drum and also on the decrease or absolute difference between the driving speeds of the recording medium and the head drum. For example, in the case of a commercially available full-loading VHS video recorder with a constant head-drum speed of rotation of 25 Hz and a tape cassette of the E 300 type it was found that, during rewinding operation at a constant speed of rotation of 19 Hz of the winding-up hub, an increase in the sliding friction can occur from as early as the onset of the second half of the overall winding time, owing to consequent turbulence and decreasing air supply upon exiting of the recording medium, increasing in speed, from the region of wrap.

In order to avoid an increase in the sliding friction, in principle the speed of rotation of the head drum or of the rotating upper head drum, having recording/playback heads, is merely increased. It has been found that, in the case of a commercially available VHS video recorder with full loading, there is virtually no detectable increase in sliding friction any longer, even with an unfavourable (smooth) head-drum outer surface and a thin tape or recording medium, if the speed of rotation of the head drum is doubled during rewinding operation.

Avoiding an increase in the sliding friction has the effect that the demand for current by the head-drum drive and hub drive is reduced, which can be put to use in a cost-saving way in the dimensioning of the recorder power supply unit and of the motors for the head-drum drive and hub drive. The process according to the invention makes it possible to reduce or even eliminate and defer the influence of the head-drum outer surface and the type of tape on the increase in sliding friction, so that the winding time can in principle be shortened as desired and/or no specific machining of the head-drum outer surface is required on account of the full-loading method.

BRIEF DESCRIPTION OF THE DRAWINGS

The invention is explained in more detail below with reference to the drawing of an exemplary embodiment, in which.

DETAILED DESCRIPTION OF THE PREFERRED EMBODIMENT(S)

Figure 1:
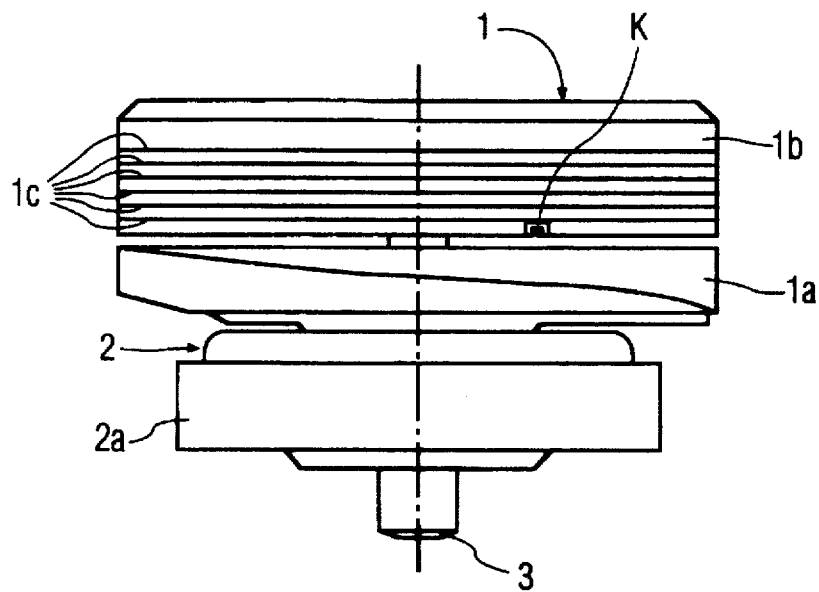
FIG. 1 shows a known head drum in diagrammatic representation.
Figure 2:
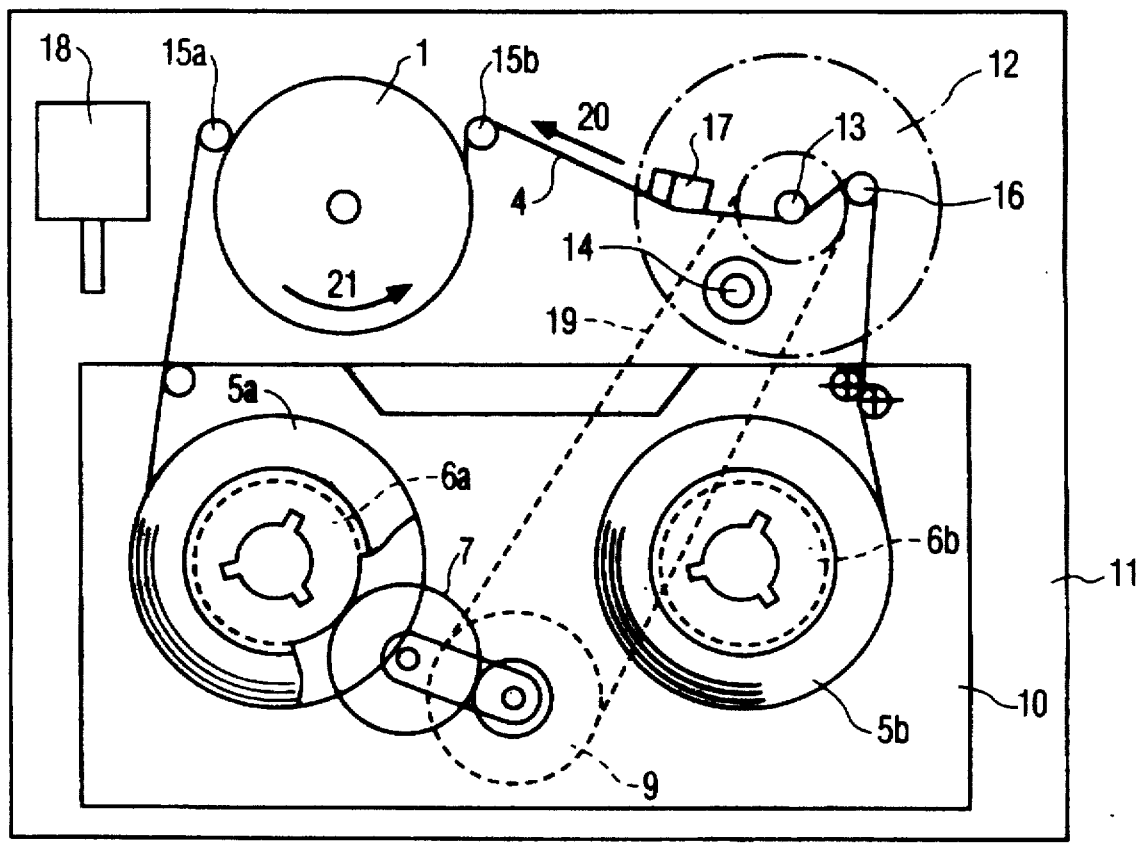
FIG. 2 shows a basic representation of a recorder drive mechanism for the helical-scan method, with a head drum according to FIG. 1.

FIG. 1 shows the front view of a head drum 1, known per se, forming a unit with a motor 2, for a VHS video recorder. It comprises the stationary lower drum 1a and the upper drum 1b, which is arranged coaxially above the said lower drum, with a certain gap in between, has recording and/or playback heads K and is fastened with the motor rotor 2a on a common shaft 3. A plurality of circumferential grooves 1c, preferably five, are provided on the circumferential surface of the upper head drum 1b. These grooves serve for supplying air for the formation of an air cushion between the head drum 1 and a recording medium wrapping around the latter, referred to hereafter as tape 4 (FIG. 2). The grooves 1c lie in a plane perpendicularly with respect to the shaft 3 and have a certain distance from one another.

FIG. 2 shows in a diagrammatic representation a drive mechanism of a VHS video recorder with a head drum according to FIG. 1. Represented is the winding and tape drive for a tape cassette 10 which is mounted on a drive-mechanism chassis 11. The tape 4, serving for recording and/or playback, is led out of the cassette 10 and placed around the head drum 1 by a threading motor 18 via threading elements 15a, 15b and 16 by means of guides (not shown). Arranged outside the cassette 10 is a capstan motor 12, with whose shaft 13, in interaction with a rubber pinch roller 14, the tape 4 can be driven for playing operation (including special operating modes). Between threading element 15b and shaft 13, the tape 4 is led past the fixed ACE head 17, known per se, for the recording and playback of synchronization and audio signals.

At the same time, the capstan motor 12 serves for driving hubs 6a; 6b, in engagement with the rolls of tape 5a; 5b. The drive takes place via a gear mechanism, comprising a rubber belt 19, a planetary gear mechanism 9 and a swivelling wheel 7. An increase in the speed of rotation of the hub for winding operation is in this case performed by short-circuiting the planetary gear mechanism 9. The tape running direction for "backward" winding operation, or rewind, is represented by an arrow 20. The direction of rotation of the head drum 1, both during playing and during winding operation, is represented by an arrow 21. Such a winding and tape drive for a tape cassette is known from WO 90/12397.

Figure 3:
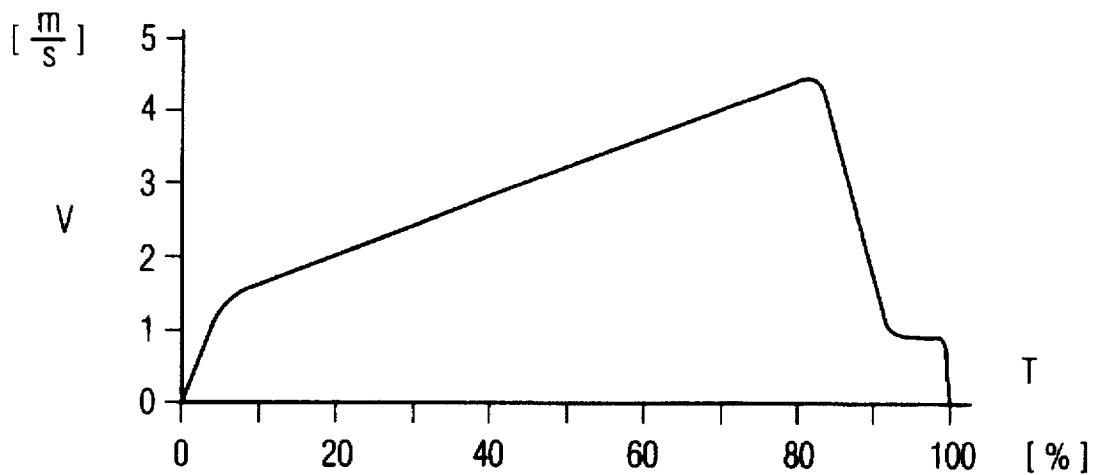
FIG. 3 shows a diagram for representing an exemplary tape speed progression during winding operation.

FIG. 3 uses a sequence diagram to show by way of example the tape speed progression during a complete winding of the tape 4, serving for recording and/or playback, from one winding element to the other winding element of a tape cassette 10 with a drive mechanism according to FIG. 2.

Plotted on the Y axis is the tape speed V in meters per second, while the winding time T is specified in per cent on the X axis, 100% corresponding to a complete tape winding.

In the case of a VHS tape cassette 10 with a diameter of the tape winding elements of about 26 mm, the tape speed on reaching a constant speed of rotation of, preferably, 19 Hz of the driven hub, for example hub 6a during rewind, is about 1.5 m per second. Continuing to keep the speed of rotation of the drawing hub constant, as shown, the tape speed increases continuously on account of the roll of tape becoming larger and, at the end of winding, would even reach the rotational speed of the rotating heads K of about 4.9 m per second if the speed of rotation of the drawing hub were not reduced, preferably at about 80% of the overall winding time, in order inter alia to protect the tape and the cassette and also the winding drive against damage.

The reduction in the speed of rotation of the drawing hub by corresponding controlling of the motor 12 is performed by a microprocessor (not shown), as is conventionally used nowadays for the sequencing control of the drive mechanism and for the open-loop and/or closed-loop control of the hub, tape and head-drum drive.

Figure 4A:
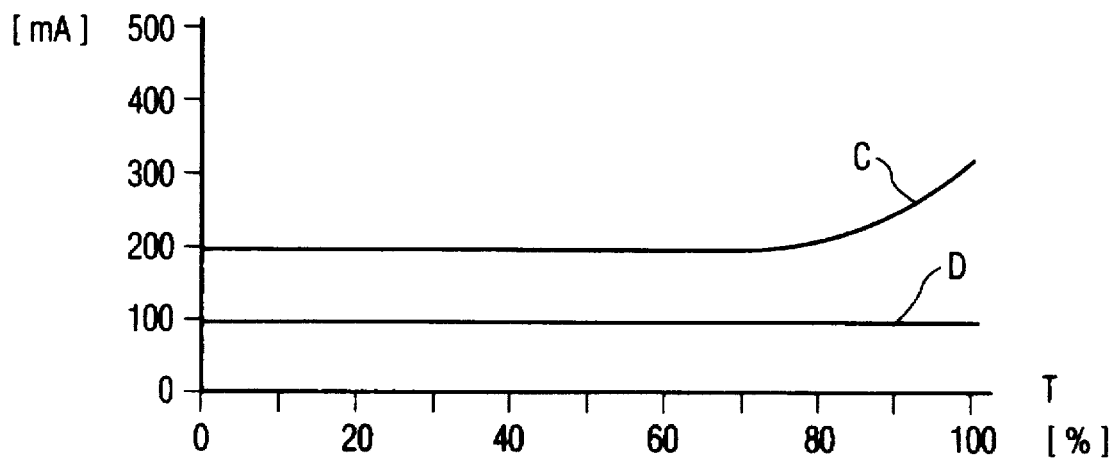
FIG. 4 shows diagrams for representing motor currents with and without an increase according to the invention of the speed of rotation of the head drum during winding operation.
Figure 4B:
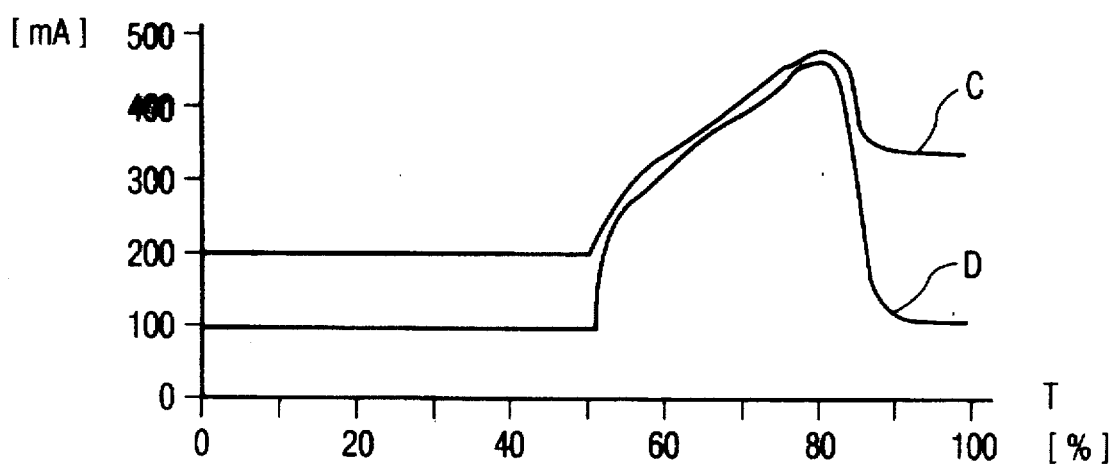

Diagrams a) and b) according to FIG. 4 show by way of example the respective current C; D during rewind of any desired VHS cassette 10 in the motor 12 driving the hub 6a at a speed of rotation of, preferably, 19 Hz and in the motor 2, driving the upper head drum 1b, the motor currents C and D in the recorder with the process according to the invention being represented in diagram a) and the motor currents C and D in the same recorder when there is no provision for increasing the speed of rotation of the head drum to avoid an increase in sliding friction during rewind being represented in diagram b).

The motor current is specified in milliamperes on the Y axis of both diagrams a) and b), while the winding time T is specified in per cent of the overall winding time on the X axis. As shown in diagram a), as distinct from diagram b), no increase in the motor current D of the head drum 1 can be detected, which is attributable to a constant sliding friction on account of a stable air layer or air cushion between the tape 4 and the head drum 1. The amount of the motor current D in this case corresponds to the amount of current of the head-drum motor 2 during idling. The progression of the two motor currents C and D according to diagram a) applies both for "backward" winding operation and for "forward" winding operation. The increase in the motor current C at the end of winding is in this case not attributable to an increase in the sliding friction between the tape 4 and the head drum 1, but to the fact that, with a constant speed of rotation of the drawing hub and with a constant fundamental friction moment of the drawn hub, the tape tension against which the motor 12 has to work becomes greater at this hub on account of the decreasing radius of the roll of tape. The representation of the progression of the motor currents C and D according to diagram b) corresponds to the use of a VHS cassette of the E 300 type.

Instead of an increase in the speed of rotation of the head drum from 25 Hz to 50 Hz for winding operation, in particular for rewind, it is also conceivable to increase the speed of rotation of the head drum 1 or of its upper part 1b only whenever an increase in the sliding friction is detected, for example by a constant evaluation of the motor current D of the head-drum motor 2 and/or of the motor 12 driving the hub. The evaluation and corresponding controlling of the speed of rotation of the head drum may be performed, for example, by the microprocessor already mentioned.

The invention is by no means suitable only for recorders with a head drum for the recording and/or playback of signals by the helical-scan method. The invention is also not restricted to recorders with a recording medium wrap around the head drum of 180°.

I claim:

1. Process for reducing the friction between a head drum and a recording medium of a tape form wrapping around the head drum of a recorder for one of the recording and playback of signals, comprising:

means for increasing a speed of rotation of the head drum during a winding operation of the recorder as a function of one of a current of a head-drum motor and of a motor driving hubs.

2. Recorder with a head drum having one of recording and playback heads for one of recording and playback of signals by a recording medium in tape form, comprising:

means for controlling a speed of rotation of the head drum during one of a "backward" and a "forward" winding operation of the recorder with respect to a play operation to a higher speed of rotation or to a higher speed of rotation dependent on a current of one of a head-drum motor and of a motor driving hubs.

* * * * *